United States Patent [19]

Adams, Jr. et al.

[11] 4,175,141

[45] Nov. 20, 1979

[54] INACTIVATION OF HEAT RESISTANT BACTERIAL PROTEASES IN ULTRA-HIGH TEMPERATURE TREATED MILK

[75] Inventors: Daniel M. Adams, Jr.; Jeff T. Barach; Marvin L. Speck, all of Raleigh, N.C.

[73] Assignee: Research Triangle Institute, Research Triangle Park, N.C.

[21] Appl. No.: 772,226

[22] Filed: Feb. 25, 1977

[51] Int. Cl.² ............................................. A23C 3/02
[52] U.S. Cl. ................................................. 426/522
[58] Field of Search ......................... 426/522, 63, 580; 195/125

[56] References Cited

U.S. PATENT DOCUMENTS

| | | | |
|---|---|---|---|
| 2,849,931 | 9/1958 | Soderlund | 426/522 X |
| 3,054,684 | 9/1962 | Smith | 426/522 X |
| 3,567,470 | 3/1971 | McElroy | 426/522 |

OTHER PUBLICATIONS

Adams et al., Heat Resistant Proteases produced by Psychrotrophic Bacteria of Dairy Origin, J. Da. Sci., vol. 58, No. 6, 1975 pp. 828–834.
Adams et al., Heat Resistant Proteases produced in Milk by Psychrotrophic Bacteria of Dairy Origin, J. Da. Sci., vol. 57, No. 5, 1974, p. 592.
Jenness, et al., Principles of Dairy Chemistry, John Wiley & Sons, N.Y., 1959, p. 324.

*Primary Examiner*—David M. Naff
*Attorney, Agent, or Firm*—Cushman, Darby & Cushman

[57] ABSTRACT

Heat resistant proteases which are commonly found in ultra-high temperature treated milk may be destroyed by holding the milk at a low temperature of greater than 50° C. up to 65° C. for at least several minutes either prior to or subsequent to the ultra-high temperature treatment.

9 Claims, 4 Drawing Figures

INACTIVATION OF HEAT RESISTANT BACTERIAL PROTEASES IN ULTRA-HIGH TEMPERATURE TREATED MILK

BACKGROUND OF THE INVENTION

Milk is generally treated prior to consumption to destroy undesirable and injurious bacteria and spores.

Well known is the process of pasteurization whereby milk may be treated according to either of two known procedures. According to the "flash" process, milk is subjected to relatively high temperatures (e.g. about 70°–75° C.) for a relatively short period of time after which it is refrigerated until time for consumption. Another known pasteurization process is the "holding" process wherein the milk is subjected to a relatively lower temperature and held at that temperature for a longer period of time. Such processes are well known in the art and have been the subject of improvement over the years as evidenced by the processes described in U.S. Pat. Nos. 364,579; 716,819; 1,196,357; 1,714,597; 1,798,413 and 3,054,684. Currently, fluid milk is pasteurized by heat treatments of whole milk at temperatures ranging from 62° to 75° C. for periods of from 30 minutes to as low as 15 seconds. This treatment is of course necessary to destroy disease-producing bacteria and check the activity of the spoilage bacteria found in raw whole milk. However, all bacteria in raw whole milk are not killed by such a treatment, and thus the milk so treated has a limited shelf-life and must be refrigerated at temperatures near 4° C. during all shipping, marketing and storing.

Recently, processes have been developed for the production of ultra-high temperature (UHT) sterilized milk (Aggarwal, M. L., 1974. "Commercial sterilization and aseptic packaging of milk products," *J. Milk Food Technol.* 37:250; Samuelsson, E. G., and S. Holm. 1966, "Technological principles for ultra-high-heat treatments of milk," *XVII Int. Dairy Congr.,* Munchen, Section B1:57; and Speck, M. L., and F. F. Busta, 1968, "Sterilization and aseptic packaging of milk products—Microbiological trends", *J. Dairy Sci.* 51:1146).

While UHT processing of milk may have a slightly different meaning in the United States and Canada from that used in Europe, each involves the treatment of milk at temperatures ranging from 120° to about 150° C. for periods up to about 8 seconds which is sufficient to sterilize the milk. One would expect such sterile milk to have an extended shelf-life without requiring refrigeration. However, research has shown that defects in UHT treated milk occasionally develop sooner than expected (See, for example, Biryukova, Z. A., V.I. Seleznes, E. I. Dombrovskaya, and A. I. Makarova. 1974, "Changes in sterilized milk during storage," *Food Sci. Technol. Abstr.* 6:163; Murthy, L., E. O. Herreid, and R. McL. Whitney, 1958. "Electrophoretic properties of casein from sterilized milk stored at different temperatures", *J. Dairy Sci.* 41:1324.). Thus, such UHT treated milk has been found to develop a bitter flavor and/or to coagulate (i.e. gelation). The coagulation and bitter flavor are thought to be caused by bacterial protease(s) which survive the ultra-high temperature treatment (See for example Adams, D. M., J. T. Barach, and M. L. Speck. 1975, "Heat resistant proteases produced in milk by psychrotrophic bacteria of dairy origin", *J. Dairy Sci.* 58:828; Bengtsson, K., L. Gardhage, and B. Isaksson. 1973, "Gelation in UHT treated milk, whey and casein solution; The effect of heat resistant proteases", *Milchwissenschaft* 28:495; Malik, A. C., and A. M. Swanson. 1974, "Heat-stable proteases from psychrotrophic bacteria in milk," *J. Dairy Sci.* 57:591. (Abstr.) and Samuelsson, E. G., and S. Holm. 1966, "Technological principles for ultra-high-heat treatments of milk", *XVII Int. Dairy Congr.,* Munchen, Section B 1:57). It has been suggested that the spoilage which results from the development of bitter taste or coagulation could be overcome by increasing the processing heat treatment. However, in light of the high heat resistance which has been reported for these bacterial proteases, a treatment which would destroy the protease would render the product quality unacceptable, and furthermore would be prohibitive from a cost standpoint.

We have discovered a low temperature heat treatment to inactivate heat-resistant bacterial proteases in ultra-high temperature treated milk.

Accordingly, it is the primary object of our invention to provide a process whereby the heat-resistant proteases appendant to ultra-high temperature treated milk may be destroyed.

It is a further object of our invention to provide a means for the production of a marketable fluid milk which is safe from deterioration and spoilage due to heat-resistant bacterial proteases.

A still yet further object of the present invention is to provide a means whereby one may prolong the shelf-life of UHT sterilized milk.

Yet another object of the present invention is to provide a means for the processing of ultra-high temperature treated milk which will remain wholesome without refrigeration and possess a good flavor which to the average consumer cannot be distinguished from freshly pasteurized, homogenized milk.

Yet a further object of the present invention is to provide a treatment for the effective and economical reduction of defects attendant to UHT treated milk due to heat-resistant proteases.

These and other objects of the present invention will be apparent from the following discussion.

SUMMARY OF THE INVENTION

Heat-resistant bacterial proteases which are commonly found in ultra-high temperature treated milk may be destroyed in accordance with the present invention by subjecting milk to a low temperature inactivation process for a period of from several minutes to about an hour at temperatures greater than 50° C. and up to 65° C.

The present invention is particularly well suited for the treatment of milk which has been or will be sterilized. As noted above, recently developed UHT sterilization techniques provide for the destruction of disease causing bacteria and spores, but fail to provide for the destruction of heat-resistant bacterial proteases present in the raw milk and which survive the UHT treatment. These known UHT processes provide for the flash cooling of the heat treated milk from temperatures from 120°–150° C. down to about 70° C. with further cooling to about 20° to 25° C. over a relatively short period of time (i.e. less than 30 seconds). The low temperature treatment provided for by the present invention results in the destruction of heat-resistant proteases which are commonly found in such ultra-high temperature treated milk. By "destruction" of heat-resistant proteases herein, is meant the irreversible loss of activity by the protease. As will be appreciated by those knowledgeable in the art, the increased shelf-life of the milk so treated is directly proportional to the degree of inactivation.

While the low temperature treatment is particularly suited to the treatment of milk which has been or will be sterilized, the process is applicable to fluid milk generally to destroy heat-resistant bacterial proteases therein.

DESCRIPTION OF THE PREFERRED EMBODIMENTS

The destruction of heat-resistant proteases commonly found in milk is carried out according to the present invention by holding milk at a temperature greater than 50° C. and up to 65° C., preferably between 50° and 60° C. and most suitably about 55° C., for at least several minutes either prior to or subsequent to the ultra-high temperature treatment of the milk. Destruction of heat-resistant bacterial proteases at these sub-sterilization temperatures is most effective. We have found that the maximum low temperature inactivation occurs at about 55° C. It has been found experimentally that only about 12% loss in activity would be expected to occur by heating for one hour at 55° C., were it not for the unique type of inactivation which we have found the proteases undergo according to the low temperature process of this invention. However, it was found with proteases from several different psychrotrophic cultures, that inactivation (i.e. destruction) occurred more rapidly and to a much greater extent than expected.

We have found that the low temperature inactivation of these heat-resistant proteases occurs at all protease concentration. Thus, destruction of these heat-resistant proteases is apparently independent of the protease concentration and accordingly occurs at the protease concentration which normally is found in raw milk.

The low-temperature inactivation process of the present invention may suitably be applied to milk, either whole or skim, prior to or subsequent to sterilization (i.e. UHT treatment). It has been found that the destruction occurs equally well both in raw as well as sterile milk. We have found that the thermal destruction at 55° C. beyond a period of one hour was essentially the same as the predicted rates. Thus, while treatments in excess of about 60 minutes would be expected to continue to destroy the protease, destruction occurs at a slower rate.

The effect of the low temperature protease inactivation on the taste of milk, even with high protease concentrations, was negligible. Also, no gross casein degradation was found to result during the treatment of milk with higher concentrations of protease than would be expected in normal milk.

While not wishing to be limited to the following, the mechanism of low temperature inactivation appears to involve partial unfolding of the protease followed by aggregation with the casein micelles. The unfolding does not destroy the protease, but the aggregation does. The chemical bonds broken to yield the unfolding are weak, therefore the process occurs readily at low temperatures. The aggregate is not formed at high temperatures, so the process is less effective at temperatures above 65° C. If this unique process (the limited unfolding and aggregation) did not occur, much longer heating times would be required at the lower temperatures (e.g. almost 1000 min. at 55° C.) because much stronger chemical bonds would have to be broken to destroy the protease. Thus, we have found that the heat-resistant proteases undergo a unique type of destruction at lower temperatures than might be otherwise expected.

In carrying out the process of the present invention, one may suitably employ an aseptic surge tank with the low temperature inactivation treatment carried out immediately prior to the sterilization step. On the other hand, one may suitably employ the low temperature inactivation process of the present invention after the sterilization step by holding the milk in an aseptic surge tank before cooling and packaging or alternatively packaging the milk at low temperature inactivation temperatures and holding at this stage prior to cooling. In a similar fashion one may package the cooled milk and then apply the low temperature inactivation treatment in a hot room.

The inactivation of proteases in milk can be advantageous in the manufacture of many products derived from, or containing milk, particularly those stored for extended periods of time. For example, in the manufacture of cheeses such as cheddar, bitterness is an objectionable flavor that often develops on ageing. By treatment of the milk to inactivate the bacterial proteases prior to the pasteurization of the cheese milk, defects from such causes can be avoided.

Another type of product is coffee cream which is stored at ambient temperature after being sterilized and aseptically packaged. Here protease inactivation could be performed before or after sterilization. Also, milk so treated may be suitable for toppings and cream for butter-making.

In dried milk the protease may stay potentially active for very long times. Combining such products to make many other foods (e.g., baby foods, custards, etc.) could cause bitterness to develop by action of protease unless inactivated by the said treatment.

Figure 1:
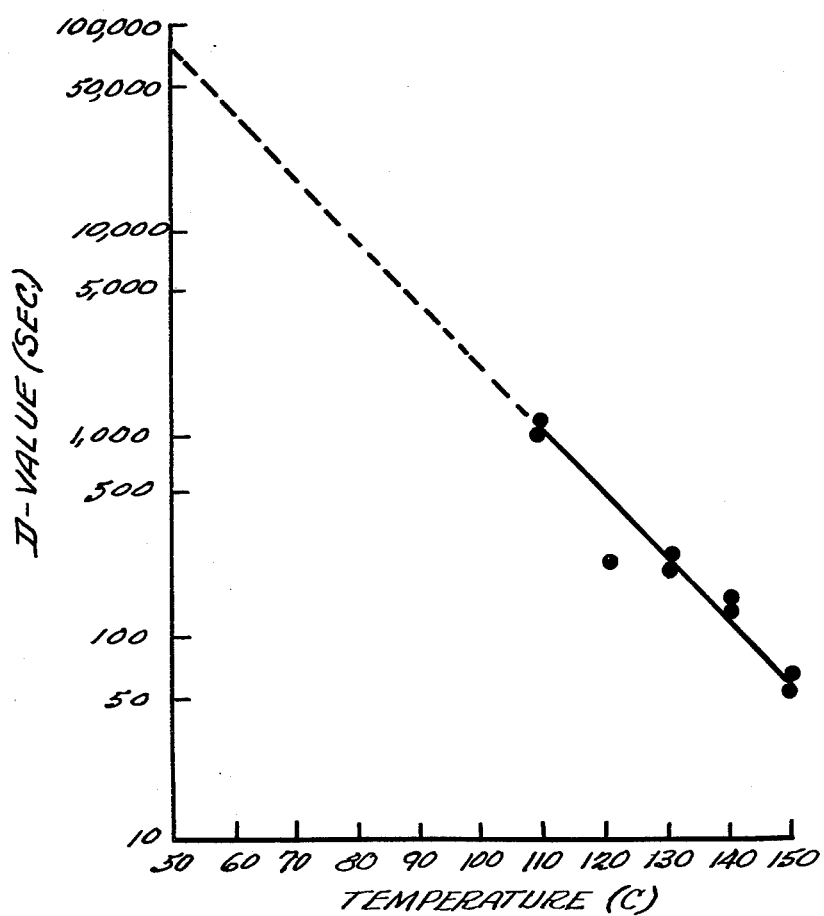
FIG. 1 is a decimal reduction time curve for the destruction of MC60 protease.

The invention will be more fully described by reference to the following examples, which are not to be construed as limiting the scope thereof.

EXAMPLE 1

Production and Purification of Heat-Resistant Proteases

Gram negative psychrotrophs isolated from raw milk were used to produce extracellular heat-resistant proteases. Production and partial purification of the crude protease was carried out in accordance with the procedure of Adams et al., supra, which is incorporated by reference. Protease from *Pseudomonas sp.* (MC60) exhibited typical heat-resistance and loss of activity at 55° C. This protease was used for the investigation of time-temperature inactivation parameters as described hereinbelow. Purified MC60 protease was obtained by gel filtration on Sephadex G-100 (Pharmacia, Sweden) in a 90×2.5 cm column. The column was eluted with simulated milk ultrafiltrate buffer (See Jennes, R. and J. Koops, "Preparation and Properties of a salt solution which simulates milk ultra-filtrate", *J. Neth. Milk Dairy,*

16:133, 1962, the contents of which is incorporated herein by reference) pH 6.7 at a flow rate of 25 ml/h.

Assay for Protease Activity

The test material was added to a solution of 3.5% vitamin free casein (Nutritional Biochemical Corp., Cleveland, Ohio), pH 7.5, and incubated at 45° C. Proteolysis was measured by the Hull method utilizing Folin-Ciocalteu reagent (See Malik, A. C. and A. M. Swanson, "Heat-stable proteases from psychrotrophic bacteria in milk", *J. Dairy Sci.* 57:591, Abstr. 1974, the entire contents of which are incorporated by reference). Substrate concentration was at saturation for the concentration of protease added. Reaction rates with time were linear with all protease added. Reaction rates with time were linear with all protease concentrations. One unit of protease was defined as the amount of enzyme producing 1 μg trichloroacetic acid (TCA) soluble material (as tyrosine) per ml per 24 hours at 45° C.

EXAMPLE 2

Heat Treatments

For inactivation studies, milk solutions of purified protease were heated in a water bath at 50° to 75° C. in capillary tubes. For low temperature inactivation of the protease, solutions of protease prepared in accordance with Example 1 were added to simulated milk ultrafiltrate buffer or milk tempered to 55° C. The treatment was terminated by quickly cooling the mixture. Remaining protease activity was measured as described above.

Ultra-high temperature sterilized skim milk was obtained by preheating raw skim milk, obtained from the North Carolina State University dairy plant, to 77° C. for 10 seconds, which was followed by direct-steam-injection heating to 149° C. for 4.5 seconds, vacuum cooling to 77° C., and aseptic collection in sterile flasks.

Electrophoretic Methods

A 3.5 M urea-9% polyacrylamide (pH 9.2) gel was used for separation and identification of casein proteins. Milk samples were treated with 3 M 2-mercaptoethanol and 3.5 M urea before application. The electrode and gel buffer was 80 mM Tris (hydroxymethyl) aminomethane-3 mM disodium ethylenediaminetetraacetate-12 mM boric acid (pH 9.2). Following electrophoresis toward the anode for 6.5 hours at 200 V (75 mA), the protein bands were stained with amido black. After destaining in 7% acetic acid, the amount of protein was quantitated by planimetry of densitometer tracings.

The effect of temperature on the inactivation of purified MC60 protease in skim milk is set forth in Table I. At temperatures of 55° C. and 60° C., loss of activity was greater than would be expected from heat alone. The measurable activity of the added protease, was reduced by 96.8% when held in milk for one hour at 55° C.

Table I

| Temperature of 1 hour treatment (°C.) | Expected remaining activity[a] % | Observed remaining activity[b] | Inactivation ratio (Expected/observed) |
|---|---|---|---|
| 50 | 77.5 | 100 | — |
| 55 | 71.0 | 3.2 | 22.2:1 |
| 60 | 60.0 | 7.1 | 8.5:1 |
| 65 | 46.0 | 31.6 | 1.5:1 |
| 70 | 35.5 | 32.3 | 1.1:1 |

Table I-continued

| Temperature of 1 hour treatment (°C.) | Expected remaining activity[a] % | Observed remaining activity[b] | Inactivation ratio (Expected/observed) |
|---|---|---|---|
| 75 | 22.6 | 25.8 | .9:1 |

[a] Based on a $D_{150} = 30$ seconds (D value — time required to reduce activity by 90%) and a $z_D$ of 32.5° C. (z value = change in temperature required to change the D value 10-fold).
[b] Initial protease activity was ca. 80,000 units/ml milk.

EXAMPLE 3

Prior to the discovery of the present invention, the resistance of MC60 protease also was evaluated for other UHT treatments. The enzyme exhibited a high degree of resistance at temperatures from 110° to 150° C. (FIG. 1). The z value (change in temperature yielding 10-fold change in rate of inactivation) for inactivation of the protease was 32.5° C. Extrapolation of the decimal reduction time curve indicated that thermal inactivation of the protease at sub-UHT would be expected to require very long treatment times, e.g. 16 to 17 hours at 55° C. to destroy 90% of the protease.

EXAMPLE 4

Figure 4:
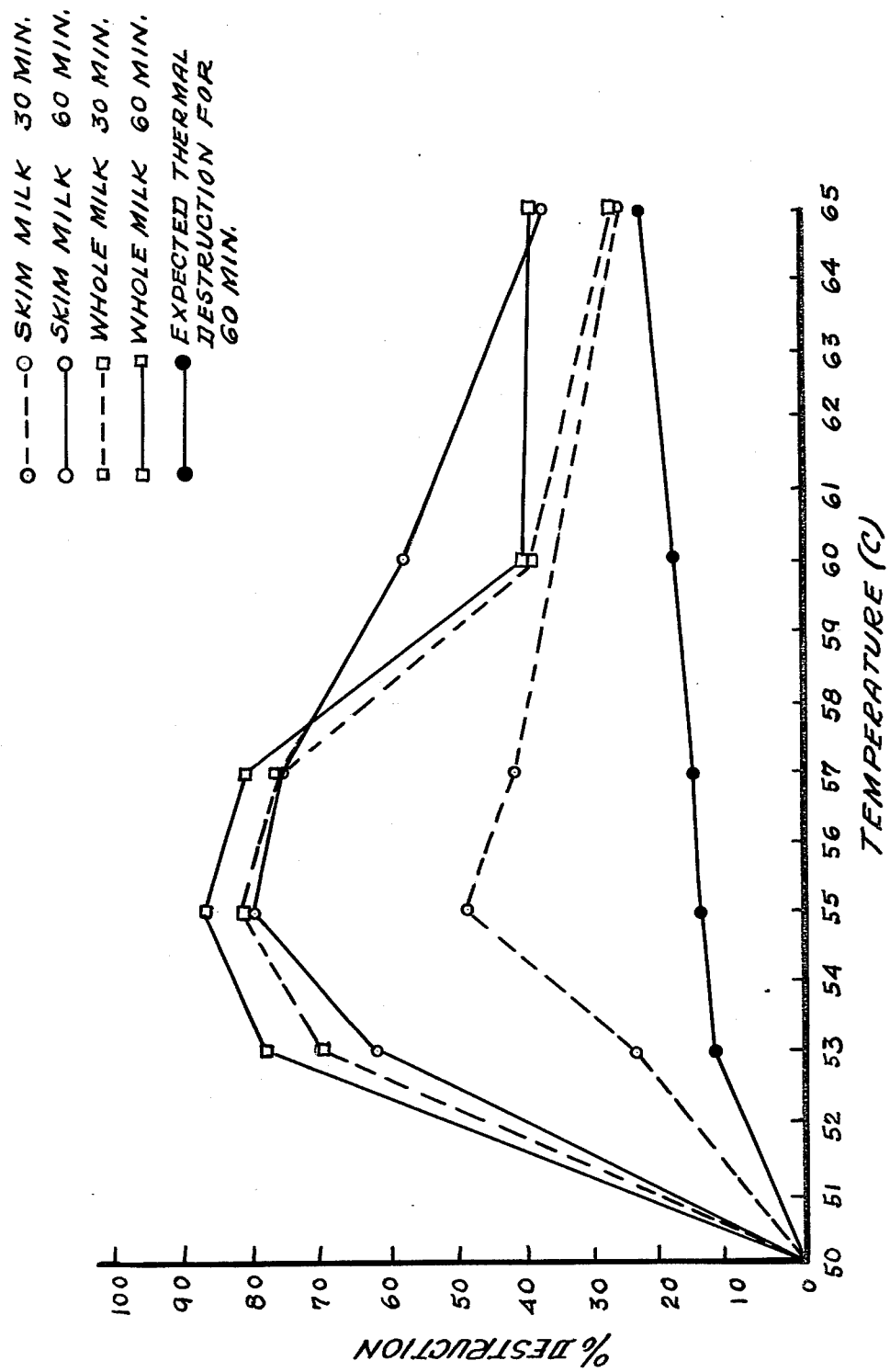
FIG. 4 represents the time-activity survival of protease in milk at various temperatures.

In accordance with the procedure of Example 2, samples of whole and skim milk containing MC60 protease were treated at 50° C., 53° C., 55° C., 57° C., 60° C. and 65° C. to determine the amount of protease destroyed after 30 and 60 minutes holding time. At 50° C. no destruction was observed, and at temperatures above 65° C., the expected thermal destruction of the milk occurred. However, between 50° and 65° C., the unexpectedly high destruction of protease occurs. FIG. 4 is a graphic comparison of the destruction observed at these various temperatures and times.

EXAMPLE 5

In accordance with the procedure of Example 2, the activity of crude proteases produced by eight other psychrotrophs isolated from raw milk was observed and found to decrease during exposure at 55° C. The results are set forth in Table II.

Table II

| | Inactivation of active protease by heat[a] | |
|---|---|---|
| Culture | 55° C. for 10 minutes % | 149° C. for 10 seconds[b] % |
| MC 7 | 98.6 | 24.4 |
| MC32 | 97.4 | 71.0 |
| MC35 | 99.0 | 16.7 |
| MC44 | 96.5 | 22.6 |
| MC50 | 98.0 | 15.4 |
| MC56 | 99.0 | 7.8 |
| MC60 | 97.8 | 24.4 |
| MC62 | 90.0 | 27.8 |
| MC64 | 97.5 | 26.5 |

[a] Crude protease in simulated milk ultrafiltrate buffer.
[b] Values from Adams et al supra.

As seen in Table II destruction of over 90% of the heat-resistant protease occurred after 10 minutes. On the other hand, except for MC-32, less than 30% destruction occurred during a 10 second treatment at 149° C. (sterilization conditions).

EXAMPLE 6

Using the procedure outlined in Example 2 above, the effect of protease concentration on low temperature inactivation was studied and the results are set forth in Table III.

Inactivation at low temperature was observed for several concentrations of crude protease solution diluted in skim milk. The percentage loss in protease activity was independent of the initial protease concentration. Crude protease solutions in milk appeared more resistant to low temperature inactivation than purified protease in milk or crude protease in buffer (Tables I and II). Holding crude protease in milk at 55° C. for 60 minutes reduced activity by ca. 70% compared to greater than 90% reduction for purified protease in milk or crude protease in buffer.

Figure 2:
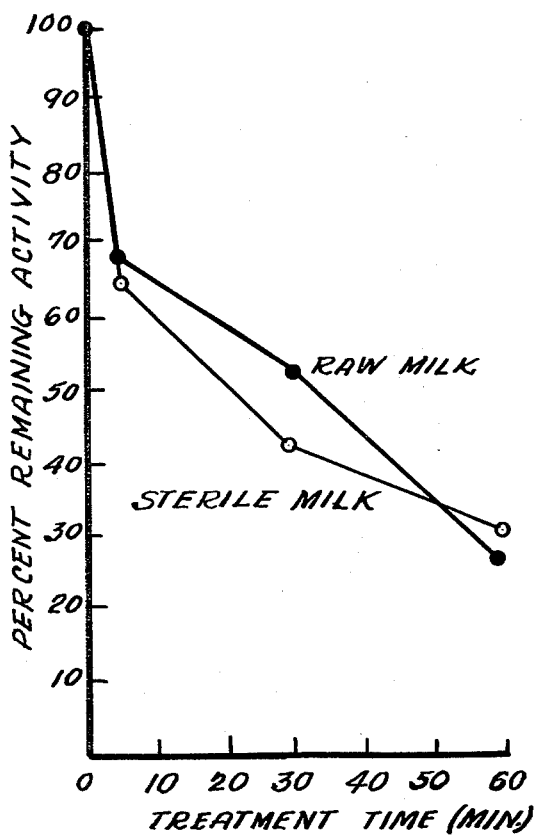
FIG. 2 is a plot of the decrease in activity with time at 55° C. for the crude protease added to raw and sterile milk.

Low temperature inactivation of crude protease occurred equally well and at the same rate in raw or 24-hours-old UHT sterilized skim milk. The decrease in activity with time at 55° C. for crude protease added to both types of milk is in FIG. 2.

Figure 3:
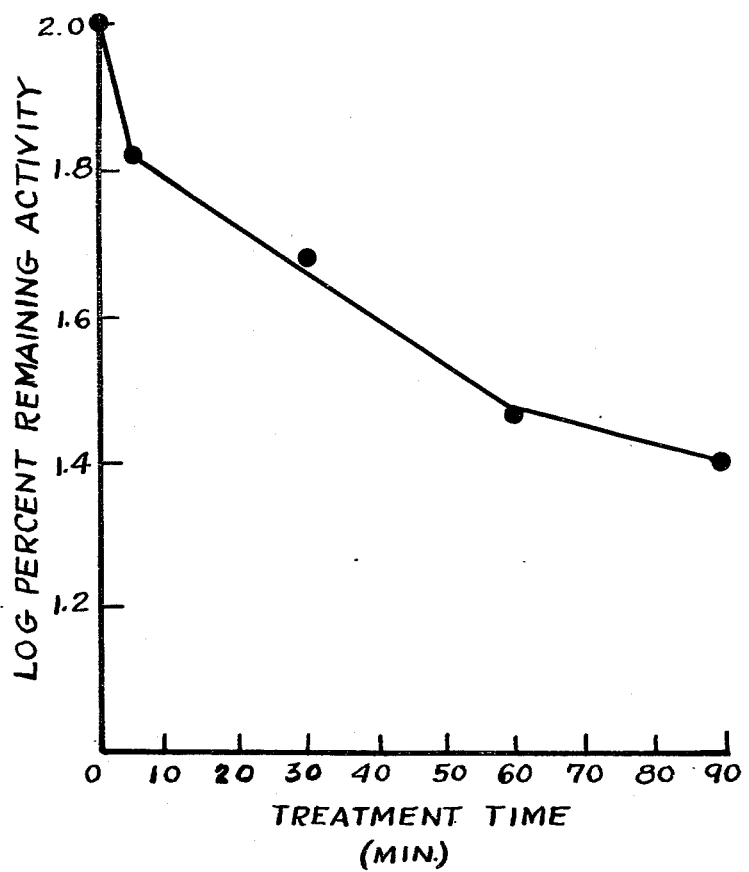
FIG. 3 represents the time-activity survival of protease in milk at 55° C.

The inactivation of crude protease at 55° C. in skim milk did not appear to be a first-order reaction. The inactivation curve is shown in FIG. 3 compared to the calculated destruction of heat-resistant protease by heat alone at 55° C. The initial decrease in the first 5 minutes of heating showed the maximum rate of inactivation. Inactivation between 60 and 90 minutes had the same D-value (410 min) as estimated for inactivation by heat alone (dashed line).

Table III

| | Protease Activity | |
|---|---|---|
| Untreated | After 55° C. for 60 min | Reduction in activity |
| (units/ml) | | (%) |
| 11290 | 3560 | 69 |
| 5640 | 1520 | 73 |
| 1129 | 448 | 60 |
| 113 | 40 | 65 |

EXAMPLE 7

The effects of low temperature treatment according to the invention on milk were investigated. Crude protease was added to raw and UHT sterilized skim milk at two concentrations, and the samples were held immediately at 55° C. for 60 min. Protease activity was reduced in the raw and sterile milk by 65% and 56% (Table IV). Results of a taste panel test of the treated milk revealed that the flavor essentially was unaffected by the treatment. Only one panelist reported a slight bitter taste with high protease in sterile milk. The slight increase in TCA soluble tyrosine after treatment at 55° C. occurred as a result of the treatment and, therefore, was unrelated to the presence of protease. The TCA soluble tyrosine value for lower protease in sterile milk compared to the control was within experimental error.

Of the milk proteins, it was found that K-casein was most susceptible to MC60 protease at temperatures below 55° C. The loss of K-casein, as measured by gel electrophoresis, was used as an index of the effect on milk proteins. Some loss of K-casein occurred during inactivation of the higher protease, but change was not measurable for milk with the lower protease. The total casein content of raw and sterile milk was also unaffected by the low temperature inactivation treatment.

TABLE IV

| | Raw skim milk | | | Sterile skim milk | | |
|---|---|---|---|---|---|---|
| Parameter tested after 55° C. for 60 min treatment | Control[a] | High protease[b] | Low protease[c] | Control[a] | High protease[b] | Low protease[c] |
| Remaining protease activity(%) | 0 | 35 | not measured | 0 | 44 | not measured |
| Taste[d] | N.C.[e] | N.C. | N.C. | N.C. | N.C.(2) | N.C. |
| TCA soluble tyrosine produced(μg/ml) | 4.8 | 4.8 | 4.8 | 3.8 | 3.8 | 4.8 |
| Loss of k-casein[f](%) | 0 | 40.0 | 0 | 0 | 20.8 | 0 |

[a]Control milk also received a 55° C. for 60 min treatment.
[b]Initial protease activity was 1130 units/ml of milk.
[c]Initial protease activity was 113 units/ml of milk.
[d]One trained and two untrained judges evaluated the sample for off-flavors.
[e]No criticism.
[f]The k-casein areas of densitometer tracings were compared to milk that received no treatment.

EXAMPLE 8

The effectiveness of the low temperature inactivation treatment for the destruction of proteases normally occurring in raw milk was tested. Raw co-mingled skim milk was obtained from several sources. The milk was sterilized in pilot plant equipment by heating at 150° C. for 4 seconds. The milk was flash cooled to ca. 70° C. A portion was collected, held at 55° C. for 60 minutes and then cooled to room temperature. The remainder was immediately cooled to below room temperature. Both portions were stored and tested weekly for evidence of protease activity. Normal raw milk was found to contain 1 to 4 units of protease per milliliter that survived UHT sterilization. The low temperature inactivation treatment destroyed 80–95% of the protease (Table V).

Table V

| | Protease Activity (Units/ml) | | |
|---|---|---|---|
| Raw Milk Sample | UHT Sterilized | UHT Sterilized +55° C./60 min. | Percent Destruction |
| 1 | 2.16 | 0.20 | 90.7 |
| 2 | 1.26 | 0.24 | 81.0 |
| 3 | 3.5 | 0.18 | 94.9 |
| 4 | 2.8 | 0.49 | 82.5 |
| 5 | 1.66 | 0.29 | 82.5 |
| 6 | 2.95 | 0.37 | 87.5 |
| 7 | 2.64 | 0.19 | 92.8 |

It is clear from the foregoing examples that heat-resistant proteases in milk undergo a unique type of inactivation (i.e. destruction) at temperatures lower than used for sterilization. It is clear that the present invention is effective over a wide range of protease concentrations including those which one would expect to occur in normal raw milk. Furthermore, the process of the present invention is equally effective on protease in either raw or sterile milk and unlike destruction of proteases according to high temperature treatments, the present invention does not affect the milk product deleteriously.

The invention in its broader aspects is not limited to the specific details shown and described, but departures may be made from such details within the scope of the accompanying claims without departing from the principles of the invention.

The invention may furthermore comprise, consist or consist essentially of the hereinbefore recited materials and steps.

We claim:

1. In the process for the ultra-high temperature treatment of milk comprising treating milk at a temperature of at least 120° C. to sterilize said milk, the improvement which comprises holding said milk at a temperature greater than 50° C. and up to 60° C. for a period of from about five to about sixty minutes immediately prior or subsequent to treating at a temperature of at least 120° C. to destroy a substantial amount of heat resistant proteases present in said milk.

2. The process of claim 1 wherein the milk is held at a temperature greater than 50° C. and up to 60° C. immediately prior to the ultra-high temperature treatment of the milk.

3. The process of claim 1 wherein the milk is held at a temperature of about 55° C.

4. The process of claim 1 wherein the milk is held at a temperature of between 50° and 60° C. for a period of about 10 to 60 minutes.

5. The process of claim 4 wherein the milk is held at a temperature of about 55° C. for a period of about 30 to 60 minutes.

6. The process of claim 1 wherein said milk is whole milk.

7. The process according to claim 1 wherein said milk is skim milk.

8. In the process for the ultra-high temperature treatment of milk comprising treating milk at a temperature of at least 120° C. to sterilize said milk, the improvement which comprises holding said milk at a temperature greater than 50° C. and up to 65° C. for a period of from about 5 to about 60 minutes subsequent to treating at a temperature of at least 120° C. to destroy substantial amount of heat resistant proteases present in said milk.

9. The process of claim 8 wherein the milk is held at a temperature of about 55° C.

* * * * *